United States Patent [19]

Shigematsu et al.

[11] Patent Number: 4,829,123
[45] Date of Patent: May 9, 1989

[54] AIR-DRYING RESIN COMPOSITION

[75] Inventors: Sadao Shigematsu, Amagasaki; Mamoru Akiyama, Ibaraki, both of Japan

[73] Assignee: Nippon Gohsei Kagaku Kogyo Kabushiki Kaisha, Osaka, Japan

[21] Appl. No.: 210,190

[22] Filed: Jun. 22, 1988

Related U.S. Application Data

[63] Continuation of Ser. No. 901,805, Aug. 29, 1986, abandoned.

[30] Foreign Application Priority Data

Sep. 4, 1985 [JP] Japan .............................. 60-195393

[51] Int. Cl.$^4$ .................. C08L 63/10; C08L 67/06; C08L 75/06; C08L 75/04
[52] U.S. Cl. ........................... 525/28; 525/440; 525/454; 525/455; 525/458; 525/528; 525/920
[58] Field of Search .............. 525/28, 440, 528, 454, 525/455, 458, 920, 921, 922

[56] References Cited

U.S. PATENT DOCUMENTS

| | | | |
|---|---|---|---|
| 4,390,662 | 6/1983 | Ando | 525/28 |
| 4,421,894 | 12/1983 | O'Connor | 525/28 |
| 4,609,706 | 9/1986 | Bode | 525/7.4 |

FOREIGN PATENT DOCUMENTS 58-215416  12/1983  Japan ............................ 525/28

Primary Examiner—Patricia Short
Attorney, Agent, or Firm—Antonelli, Terry & Wands

[57] ABSTRACT

An drying resin composition comprises (A) at least one radical curable resin selected from the group consisting of an unsaturated polyester resin, an urethane-acrylic resin, a polyester-acrylic resin and an epoxy-acrylic resin, (B) an urethane-acrylic oligomer having 1.0 to 10.0 mmole/g of allyl ether groups and 0.2 to 5 mmole/g of (meth)acryloyl groups, (C) and ethylenically unsaturated monomer and (D) an initiator. The composition has an improved drying property and provides a coating film having improved flexibility, weatherability and water resistance.

6 Claims, No Drawings

AIR-DRYING RESIN COMPOSITION

This application is a continuation fo application Ser. No. 901,805, filed Aug. 29, 1986, now abandoned.

BACKGROUND OF THE INVENTION

The present invention relates to an air-drying resin composition which is more excellent in various properties than that of previous air-drying resin compositions.

Radical curable resins such as an unsaturated polyester resin, an urethane-acrylic resin, a polyesteracrylic resin and an epoxy-acrylic resin are widely used in coatings of furniture, trim materials, household articles, and the like. The coating films are excellent in drying properties, sanding properties, film hardness, and the like, and the demands for the coatings have been increasing as one of the useful coatings.

However, recently air drying property, weatherability and flexibility as well as the improvements of the above-mentioned properties are required for the coatings.

Allyl ether groups are usually introduced into a resin in order to give high air drying property. However, these requirements have not been satisfied since there is a limit for the amount of the introduced allyl ether grops from the viewpoint of the generation of a gel when producing a resin. Further, there are many problems for giving the resin weatherability, flexibility, and the like.

This and other objects of the present invention will become apparent from the description hereinafter.

SUMMARY OF THE INVENTION

In accordance with the present invention, there is provided an air-drying resin composition comprising
(A) at least one radical curable resin selected from the group consisting of an unsaturated polyester resin, an urethane-acrylic resin, a polyester-acrylic resin and an epoxy-acrylic resin,
(B) an urethane-acrylic oligomer having 1.0 to 10.0 mmole/g of allyl ether groups and 0.2 to 5 mmole/g of acryloyl groups or methacryloyl groups,
(C) an ethylenically unsaturated monomer and
(D) an initiator.

DETAILED DESCRIPTION

A radical curable resin, for the typical example, an unsaturated polyester resin is used as the above-mentioned component (A).

The unsaturated polyester resin can be usually prepared by condensing a polybasic acid, a polyhydric alcohol and, as occasion demands, a polyhydric alcohol allyl ether in a convenience manner.

Examples of the above-mentioned polybasic acid are, for instance, unsaturated polybasic acids such as maleic acid, fumaric acid, itaconic acid, citraconic acid and their anhydride, and, as occasion demands, saturated polybasic acids such as phthalic acid, isophthalic acid, telephthalic acid, chlorendic anhydride, adipic acid, sebacic acid, succinic acid, azelaic acid and their anhydride can be used at the same time. Examples of the above-mentioned polyhydric alcohol are, for instance, ethylene glycol, propylene glycol, butylene glycol, diethylene glycol, trimethylene glycol, triethylene glycol, trimethylolethane, trimethylolpropane, dihydroxypentadiene, pentaerythritol, glycelol, diglycerol, di-trimethylolpropane, and the like. Examples of polyhydric alcohol allyl ether are, for instance, glycerol monoallyl ether, trimethylolpropane monoallyl ether, trimethylolpropane diallyl ether, trimethylolethane monoallyl ether, trimethylolethane diallyl ether, pentaerythritol monoallyl ether, pentaerythirtol diallyl ether, pentaerythritol triallyl ether, 1,2,6-hexanetriol monoallyl ether, 1,2,6-hexanetriol diallyl ether, sorbitan monoallyl ether, sorbitan diallyl ether, and the like. However, the polyhydric alcohol allyl ether are not limited to the exemplified ones.

The urethane-acrylic resin means a reaction product of (a) a diisocyanate compound, (b) a polyester polyol or a polyhydric alcohol and (c) a (meth)acrylic monomer.

The above-mentioned components (a), (b) and (c) are subjected to the reaction by suitable means such a method that charging the components (a), (b) and (c) at a time, a method that charging the components (a), (b) and (c) independently, a method that charging the components (a), (b) and (c) continuously.

When the urethane-acrylic resin is used as a paint, it is particularly effective that the molecular weight is 700 to 3000 and the content of urethane bond is 5 to 15 % by weight based on NCO group.

Examples of (a) a diisocyanate are, for instance, 2,4-tolylene diisocyanate, 2,6-tolylene diisocyanate, m-xylene diisocyanate, p-xylene diisocyanate, diphenylmethane-4,4'-diisocyanate, hexamethylene diisocyanate, isophorone diisocyanate, lysine diisocyanate, their denaturated diisocyanates, hydrogenated diisocyanate, and these diisocyanates may be employed alone or in admixture thereof.

Examples of (b) a polyhydric alcohol are, for instance, ethylene glycol, propylene glycol, diethylene glycol, triethylene glycol, tetraethylene glycol, dipropylene glycol, 1,4-butanediol, 1,6-hexanediol, neopentyl glycol, cyclohexandimethanol, hydrogenated bisphenol A, polyethylene glycol, polypropyrene glycol, polytetramethylene glycol, polycaprolactone, glycerol, trimethylolethane, trimethylolpropane. The polyester polyol used in the present invention is a reactant of the above-mentioned polyhydric alcohol and a polybasic acid having a hydroxyl value of 60 to 600 KOH mg/g.

As a main component of the polybasic acid, an unsaturated acid such as maleic anhydride, maleic acid, fumaric acid, itaconic anhydride or itaconic acid is used, and phthalic anhydride, phthalic acid, telephthalic acid, isophthalic acid, chlorendic anhydride, adipic acid, tetrahydrophthalic anhydride, and the like can be added in the polybasic acid as occasion demands.

The (c) (meth)acrylic monomer must have active hydrogens in the molecule. Examples of the (meth)acrylic monomer are, for instance, acrylic acid, methacrylic acid, 2-hydroxyethyl acrylate, 2-hydroxyethyl methacrylate, 2-hydroxypropyl acrylate, 2-hydroxypropyl methacrylate, 2-hydroxyethyl acryloylphosphate, acrylamide, methacrylamide, N-methylolacrylamide, N-methylolmethacrylamide, N-methoxymethylacrylamide, N-ethoxymethylacrylamide, ethylene glycol monoacrylate, dipropylene glycol monoacrylate, N,N-dimethylaminoethyl acrylate, and these (meth)acrylic monomers may be employed alone or in admixture thereof.

The polyester-acrylic resin means a resin that an acrylic monomer is introduced into the end of the above-mentioned unsaturated polyester resin as mentioned above. The acrylic monomer is the same as the above-mentioned (c).

The epoxy-acrylic resin means a resin that an acrylic monomer is reacted with the epoxy group of the bifunctional bisphenol A type epoxy resin.

The bifunctional bisphenol A type epoxy resin has a following constitutional formula:

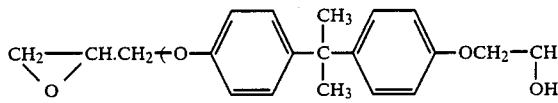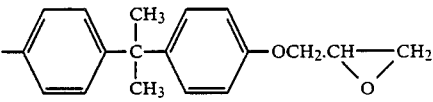

wherein n is an integer of 0 to 3.

The suitable epoxy equivalent of the above-mentioned epoxy resin is 100 to 500, preferably 180 to 300.

The acrylic monomer is the same as the above-mentioned (c).

The urethane-acrylic oligomer having an allyl ether group and a (meth)acrlyloyl group which is the above-mentioned component (B) in the present invention is a reaction product of (a) a diisocyanate compound; (b) a polyester polyol or a polyhydric alcohol; (c) an allyl ether of the polyhydric alcohol and (d) a (meth)acrylic monomer. The components (a), (b), (c) and (d) are subjected to the reaction by suitable means such a method that charging them at a time, a method that charging them independently or a method that charging them continuously.

The content of the allyl ether group should be adjusted to the range of 1.0 to 10.0 mmole/g, preferably 2.0 to 5.0 mmole/g. When the content is less than 1.0 mmole/g, the obtained resin does not show sufficient flexibility, and the resin is lack in the effect of the improvement of the air-drying property. When the content of the allyl ether group is more than 10.0 mmole/g, an obtained resin shows a remarkable defect that the resin is lack in hardenability.

Further, the content of the (meth)acryloyl group should be in the range of 0.2 to 5.0 mmole/g, preferably 0.4 to 2.0 mmole/g. When the content of the (meth)acryloyl group is less than 0.2 mmole/g, the resin is lack in drying property. When the content is more than 5.0 mmole/g, an obtained coating film comes to be brittle, or the coherence property of the coating to a material is lowered.

It is particular effective that the molecular weight of the component (B) is 450 to 800, preferably 450 to 700 and the content of the urethane bond is about 5 to 15 % by weight based on NCO group. The used amount (mole ratio) of the components (a), (b), (c) and (d) for obtaining the component (B) is (a):(b):(c):(d)=1:0.1 to 0.5:0.2 to 0.9:0.1 to 0.7.

Examples of the (a) diisocyanate compound are, for instance, 2,4-tolylene diisocyanate, 2,6-tolylene diisocyanate, m-xylene diisocyanate, p-xylene diisocianate, diphenylmethane-4,4'-diisocyanate, hexamethylene diisocyanate, isophorone diisocyanate, lysine diisocyanate, their denaturated diisocyanates, hydrogenated diisocyanate, and these diisocyanates may be employed alone or in admixture thereof.

Examples of the (b) polyhydric alcohol are, for instance, ethylene glycol, propylene glycol, diethylene glycol, triethylene glycol, tetraethylene glycol, dipropylene glycol, 1,4-butanediol, 1,6-hexandiol, neopentyl glycol, cyclohexandimethanol, hydrogenated bisphenol A, polyethylene glycol, polypropyrene glycol, polytetramethylene glycol, polycaprolactone, glycerol, trimethylolethane, trimethylolpropane. The polyester polyol used in the present invention is a reactant of the above-mentioned polyhydric alcohol and a polybasic acid having a hydroxyl value of 60 to 600 KOH mg/g.

As a main component of the polybasic acid, an unsaturated acid such as maleic anhydride, maleic acid, fumaric acid, itaconic anhydride or itaconic acid is used, and phthalic anhydride, phthalic acid, telephthalic acid, isophthalic acid, chlorendic anhydride, adipic acid, tetrahydrophthalic anhydride, and the like can be added in the polybasic acid as occasion demands.

Examples of the (c) polyhydric alcohol allyl ether are, for instance, pentaerythritol diallyl ether, trimethylolpropane diallyl ether, glycerol monoallyl ether, trimethylolethane diallyl ether, glycerol diallyl ether. Every exemplified polyhydric alcohol allyl ether has at least one hydroxyl group in its molecule.

The (d) (meth)acrylic monomer must have active hydrogens in the molecule. Examples of the (meth)acrylic monomer, for instance, are acrylic acid, methacrylic acid, 2-hydroxyethyl acrylate, 2-hydroxyethyl methacrylate, 2-hydroxypropyl acrylate, 2-hydroxypropyl methacrylate, 2-hydroxyethyl acryloylphosphate, acrylamide, methacrylamide, N-methylolacrylamide, N-methylolmethacrylamide, N-ethoxymethylacrylamide, ethylene glycol monoacrylate, dipropylene glycol monoacrylate, N,N-dimethylaminoethyl acrylate, and these (meth)acrylic monomers may be employed alone or in admixture thereof.

Examples of the (C) ethylenically unsaturated monomer are compounds having one vinyl group in the molecule such as styrene, vinyltoluene, chlorostyrene, α-methylstyrene, methyl methacrylate, methyl acrylate, ethyl acrylate, acrylonitrile, vinyl acetate, 2-hydroxyethyl methacrylate, 2-hydroxypropyl methacrylate, cyclohexyl acrylate, dicyclopentenyl acrylate, N-vinylpyrrolidone, furfuryl acrylate, carbitol acrylate, benzyl acrylate, butoxyethyl acrylate, allyl acrylate, phenoxyethyl acrylate, acryloxyethyl phosphate, 2-vinylpyridine, and these unsaturated monomers may be employed alone or in admixture thereof.

For the (D) initiator, thermosetting type or photosetting type initiator can be used. Examples of the (D) initiator are, for instance, cobalt octenoate, cobalt naphthenate, manganese octenoate, manganese naphthenate, methyl ethyl ketone peroxide, cyclohexanone peroxide, cumenhydroperoxide, benzoyl peroxide, dicumyl peroxide, t-butyl perbenzoate, benzoin, benzoin methyl ether, benzoin ethyl ether, benzoin isopropyl ether, benzoin n-butyl ether, benzoin phenyl ether, anthraquinone, naphtoquinone, privaloin ethyl ether, benzylketal, 1,1-dichloroacetophenone, p,t-butyldichloroacetophenone, 2-chlorothioxanthone, 2,2-diethoxyacetophenone, Michler's ketone, 2,2-dichloro-4-phenylacetophenone, 2,2-dimethoxy-2-phenylacetophenone, benzophenon, 2-methylthioxanthone, phenyl glyoxylate, α-hydroxyisobutylphenone, benzophenoneamines such as N-methyl-diethanolamine and triethylamine, benzyldiphenyldisulfide, tetramethylthiurammonosulfide, azobisisobutyronitrile, dibenzyl, diacethyl, acetophenone.

The preferable mixing ratio of the above-mentioned components (A), (B), (C) and (D) is that the component (B) is 5 to 60 parts by weight, the component (C) is 0.1 to 10 parts by weight and the component (D) is 5 to 60 parts by weight, based on 100 parts by weight of the component (A).

Futher, when the resin composition is employed as a paint, pigments, curing agents, fillers, levelling agents, diluents, thermoplastic resins, and the like can be added in the resin composition as additive agents.

Examples of the pigment are, for instance, titanium white, cyanine blue, chrome yellow, Watchung Red, red ion oxide, carbon black, aniline black, and the like.

Examples of the curing agent are, for instance, methyl ethyl ketone peroxide, cyclohexanone peroxide, benzoyl peroxide, dicumyl peroxide, t-butyl perbenzoate.

Examples of the diluent are, for instance, ethyl acetate, toluene, xylene, methanol, ethanol, butanol, acetone, methyl ethyl ketone, methyl isobutyl ketone, cellosolve, diacetone alcohol, and the like.

Examples of the thermoplastic resin are, for instance, cellulose acetate butyrate, nitrocellulose, vinyl chloride resin, vinyl acetate resin, acryric resin and their copolymer, butylated melamine resin, butylated urea resin, and the like. Also, the thermoplastic resin can be used jointly with a wax-type unsaturated polyester resin.

Examples of the other additive agents are, for instance, phosphoric acid, tartaric acid, phosphorous acid, fats and oils, silicone oil, surface active agents, and the like.

The resin composition of the present invention is useful for the paints to coat a flexible material such as a film, a sheet metal or a non-woven fabric. However, the flexible materials are not limited to the exemplified ones, and the resin composition can be also employed in the paints to coat a suitable material such as wood work, a glass product, or a cement product. Further, the resin composition can be also used as adhesives, caulking compounds, and the like.

The resin composition of the present invention which has been suitably subjected to casting or coating for the various purposes is cured by heating or luminous radiating with a high pressure mercury lamp, a low pressure mercury lamp, a middle pressure mercury lamp, or the like, and then a coating film having flexibility is obtained. Further, since the curing time of the resin composition is steeply shorter than that of the previous radical curable resin composition, the slight difference of the curing time brings a remarkable effect for the field which is influenced on the productive efficiency, e.g., when they are subjected to line-coating.

The present invention is more specifically described and explained by means of the Examples, in which all parts and % are by weight unless otherwise noted. It is to be understood that the present invention is not limited to Examples, and various changes and modification may be made in the invention without departing from the spirit and scope thereof.

A resin of component (A)

Resin 1: Unsaturated polyester resin (which comprises maleic anhydride/propylene glycol/diethylene glycol/pentaerythritol triallyl ether=1.0/0.5/0.5/0.15 (mole ratio), and the molecular weight is 1,500).

Resin 2: Urethane-acrylic resin (which comprises isophorone diisocyanate/2-hydroxyethyl acrylate/polytetramethylene glycol (molecular weight: 850)=3.0/2.05/5.0 (mole ratio), and the molecular weight is 2,600).

Resin 3: Polyester-acrylic resin (which comprises maleic anhydride/phthalic anhydride/propylene glycol/diethylene glycol/acrylic acid =0.5/0.4/0.5/0.5/0.2 (mole ratio), and the molecular weight is 1,800).

Resin 4: Epoxy-acrylic resin (bisphenol A glycidyl ether/acrylic acid =1.0/2.0 (mole ratio), and the molecular weight is 570).

Preparation of the component (B) Preparation of oligomer (1); A flask was charged with 1.0 mole of ethylene glycol, 1.0 mole of hydroxyethyl acrylate and 1.0 mole of glycerol monoallyl ether, and then the polymerization reaction was carried out at a temperature of at most 50° C. with stirring by adding 2.0 mole of isopholon diisocyanate dropwise to give 0.5 % of free isocyanate group. The obtained resin had 1.5 mmole/g of allyl ether group, 1.5 mmole/g of acryloyl group, 500 of average molecular weight and 11.0% of NCO group.

Preparation of oligomer (2); 1.0 mole of glycelol, 1.0 mole of 2-hydroxyethyl acrylate, 1.0 mole of trimethylolpropane diallyl ether and 2.0 mmole of tolylene diisocyanate were polymerized in the same manner as in Preparation of oligomer (1). The obtained resin had 2.5 mmole/g of allyl ether group, 1.5 mmole/g of acryloyl group, 660 of average molecular weight and 10.6% of NCO group.

Preparation of oligomer (3); 1.0 mole of pentaerythritol, 1.5 mole of 2-hydroxyethyl methacrylate, 1.0 mole of pentaerythritol triallyl ether and 2.0 mole of tolylene diisocyanate were polymerized in the same manner as in Preparation of oligomer (1). The obtained resin had 3.5 mmole/g of allyl ether group, 2.0 mmole/g of methacryloyl group, 580 of average molecular weight and 11% of NCO group.

Preparation of oligomer (4); 1.0 mole of glycerol, 1.0 mole of 2-hydroxyethyl acrylate, 1.0 mole of glycerol diallyl ether and 2.0 mole of tolylene diisocyanate were polymerized in the same manner as in Preparation of oligomer (1). The obtained resin had 3.0 mmole/g of allyl ether group, 1.0 mmole/g of acryloyl group, 660 of average molecular weight and 15.0% of NCO group.

Preparation of oligomer (5); 250 g of ethylene glycolphthalic anhydride condensation product (value of hydroxyl group: 470 KOH mg/g), 1.0 mole of pentaerythritol triallyl ether, 0.5 mole of 2-hydroxyethyl acrylate and 1.5 mole of tolylene diisocyanate were polymerized in the same manner as in Preparation of oligomer (1). The obtained resin had 4.0 mmole/g of allyl ether group, 0.7 mmole/g of acryloyl group, 680 of average molecular weight and 14.0% of NCO group.

EXAMPLES 1 to 5

A thermosetting paint was prepared by admixing the components (A), (B), (C) and (D) shown in Table 1, and then 200 g/m² of the obtained thermosetting paint was coated on an urethane-sealer-precoated plywood made of chinese wood to measure the properties. The results were shown in Table 1.

EXAMPLES 6 to 10

A UV-curable paint was prepared by admixing the components (A), (B), (C) and (D) shown in Table 1, and the properties were measured in the same manner as in Examples 1 to 5. The results were shown in Table 2.

Flexibility:

The obtained coating film was kept at 80° C. for 2 hours, and then −20° C. for 2 hours. The above treatment was repeated until cracks occurred on the coating film and counted the cycles of the above treatment.

Drying property of the coating surface:

The coating film was dried for three hours, and then a sheet of carbon transfer paper was put on the obtained coating film, and the pressure of 250 g/m² was added on the carbon transfer paper. In accordance with the degree of transference of carbon, that is, from 0 to 5, the surface diability was obserbed. (The minor value shows that the coating film is in a good state.)

Sanding property:

The obtained coating film was kept for 12 hours, and then was sanded with a sheet of sandpaper of #240. Then, the surface of the coating film was observed with the naked eye.

TABLE 1

|  | Component A (Parts) | Component B (Parts) | Component C (Parts) | Component D | | State of the coating surface | | |
|---|---|---|---|---|---|---|---|---|
|  |  |  |  | 8% of cobalt octenoate (Parts) | Methyl ethyl ketone peroxide (Parts) | Flexibility (cycles) | Drying property of The coating surface | Sanding property |
| Ex. 1 | Resin 1 100 | Oligomer (1) 30 | Styrene 40 | 0.65 | 2.6 | 30 | 0 | ◉ |
| Ex. 2 | Resin 1 100 | Oligomer (3) 30 | Styrene 40 | 0.65 | 2.6 | 20 | 0.2 | ◉ |
| Ex. 3 | Resin 2 100 | Oligomer (2) 30 | Styrene 40 | 0.65 | 2.6 | 40 | 0.1 | ◉ |
| Ex. 4 | Resin 3 100 | Oligomer (4) 30 | Styrene 40 | 0.65 | 2.6 | 50 | 0.3 | ◉ |
| Ex. 5 | Resin 4 100 | Oligomer (5) 30 | Styrene 40 | 0.65 | 2.6 | 50 | 0.3 | ◉ |

TABLE 2

|  | Component A (Parts) | Component B (Parts) | Component C (Parts) | Component D (Parts) | State of the coating surface | | |
|---|---|---|---|---|---|---|---|
|  |  |  |  |  | Flexibility (cycles) | Drying property of the coating surface after exposing with a high pressure mercury lamp*[1] | |
|  |  |  |  |  |  | after 0.5 seconds | after 10 seconds |
| Ex. 6 | Resin 1 100 | Oligomer 1 30 | 2-Ethylhexyl Acrylate 40 | Benzoin isopropyl Ether 2 | 25 | 0 | 0 |
| Ex. 7 | Resin 1 100 | Oligomer 3 30 | 2-Ethylhexyl Acrylate 40 | Benzoin isopropyl Ether 2 | 25 | 0.1 | 0 |
| Ex. 8 | Resin 2 100 | Oligomer 2 30 | 2-Ethylhexyl Acrylate 40 | Benzoin isopropyl Ether 2 | 30 | 0 | 0 |
| Ex. 9 | Resin 3 100 | Oligomer 4 30 | 2-Ethylhexyl Acrylate 40 | Benzoin isopropyl Ether 2 | 40 | 0.2 | 0 |
| Ex. 10 | Resin 4 100 | Oligomer 5 30 | 2-Ethylhexyl Acrylate 40 | Benzoin isopropyl Ether 2 | 40 | 0.2 | 0 |

*[1] A high pressure mercury lamp having an output of 80 W/cm was used.

What is claimed is:

1. An air-drying resin composition comprising (A) at least one radical curable resin selected from the group consisting of an unsaturated polyester resin, an urethane-acrylic resin, a polyester-acrylic resin other than said unsaturated polyester resin and an epoxy-acrylic resin other than said urethane-acrylic resin; the unsaturated polyester resin being obtained by condensing a polybasic acid and a polyhydric alcohol, the urethane-acrylic acid resin being produced by reacting (a) a diisocyanate compound, (b) an unsaturated polyester polyol or a polyhydric alcohol and (c) a (meth)acrylic monomer, the polyester-acrylic resin being produced by introducing an acrylic monomer into the end of an unsaturated polyester resin and the epoxy-acrylic resin being produced by reacting an acrylic monomer with an epoxy group of a bifunctional bisphenol A epoxy resin,
(B) an urethane-acrylic oligomer other than said urethaneacrylic resin, said oligomer having 1.0 to 10.0 mmole/g of allyl ether groups and 0.2 to 5 mmole/g of acryloyl groups or methacryloyl groups which is produced by reacting (a) a diisocyanate compound, (b) an ethylene glycol-phthalic anhydride condensation product or a polyhydric alcohol, (c) an allyl ether of said polyhydric alcohol and (d) a (meth)acrylic monomer,
(C) an ethylenically unsaturated monomer and
(D) an initiator.

2. An air-drying resin composition according to claim 1, wherein the curable resin is an unsaturated polyester resin obtained by condensing a polybasic acid, a polyhydric alcohol and a polyhydric alcohol allyl ether.

3. An air-drying resin composition according to claim 2, wherein the polybasic acid is an unsaturated polybasic acid selected from the group consisting of maleic acid, fumaric acid itaconic acid, citraconic acid and anhydrides thereof.

4. An air-drying resin composition according to claim 3, wherein the polyhydric alcohol is selected from the group consisting of ethylene glycol, propylene glycol, butylene glycol, diethylene glycol, trimethylene glycol, triethylene glycol, trimethylolethane, trimethylolpropane, dihydroxypentadiene, pentaerythritol, glycerol, diglycerol, and ditrimethylolpropane.

5. An air-drying resin composition according to claim 1, wherein the ethylenically unsaturated monomer is selected from the group consisting of styrene, vinyltoluene, chlorostyrene, α-methylstyrene, methyl methacrylate, methyl acrylate, ethyl acrylate, 2-ethylhexyloacrylate, acrylonitrile, vinyl acetate, 2-hydroxyethyl methacrylate, 2-hydroxypropyl methacrylate, cyclohexyl acrylate, dicyclopentenyl acryalte, N-vinylpyrrolidone, furfuryl acrylate, carbitol acrylate, benzyl acrylate, butoxyethyl acrylate, allyl acrylate, phenoxyethyl acrylate, acryloxyethyl phosphate, and 2-vinylpyridine.

6. An air-drying resin composition according to claim 1, wherein the mixing ratio of components (A), (B), (C) and (D) is that component (B) is 5 to 60 parts by weight, component (C) is 0.1 to 10 parts by weight, and the component (D) is 5 to 60 parts by weight, based on 100 parts by weight of the component (A).

* * * * *